United States Patent [19]

Ackerman

[11] Patent Number: 4,978,270
[45] Date of Patent: Dec. 18, 1990

[54] HEADLESS RIVET
[75] Inventor: George Ackerman, Twin Lakes, Wis.
[73] Assignee: AKH, Inc., McHenry, Ill.
[21] Appl. No.: 376,808
[22] Filed: Jul. 7, 1989

Related U.S. Application Data

[63] Continuation-in-part of Ser. No. 79,953, Jul. 31, 1987, abandoned.

[51] Int. Cl.[5] .......................... F16B 19/06; F16B 21/00
[52] U.S. Cl. ..................................... 411/511; 411/455; 411/504; 29/520; 29/525.2
[58] Field of Search .......................... 411/180, 500–504, 411/455, 510, 511, 513, 514, 516; 29/520, 432, 432.1, 432.2, 525.2

[56] References Cited

U.S. PATENT DOCUMENTS 4,130,922 12/1978 Koett ..................................... 29/520
3,270,793 9/1966 Polmon ................................ 411/180
3,349,649 10/1967 Mele ..................................... 411/455
3,571,903 3/1971 Persson ................................ 29/520
3,909,913 10/1975 Tildesley ............................. 29/520

Primary Examiner—Neill R. Wilson

[57] ABSTRACT

A headless rivet is disclosed as made from steel or suitable material that provides superior compressive strength compared to conventional rivets and to that of a material to be riveted together and of a height or axial thickness equal to the sum of the materials to be riveted, the rivet having flat end surfaces and a shoulder interposed therebetween with curved neck portions extending from said shoulder to said flat ends. The curved neck portions have a predetermined radius and a predetermined depth of concavity determined according to the height of the rivet. Another embodiment discloses a rivet having ridges interposed between the shoulder and the flat ends including respective neck portions extending from said shoulder to said ridges to said flat ends.

8 Claims, 1 Drawing Sheet

HEADLESS RIVET

This application is a continuation in part of my copending application Ser. No. 079,953 filed July 31, 1987, now abandoned.

BACKGROUND OF THE INVENTION

Prior Art

This invention relates to headless rivets and more particularly to headless rivets having superior strength.

The headless rivet of the present invention is an improvement over the autolocking self-piercing rivet disclosed in abandoned application Ser. No. 906,479 filed May 17, 1978 in that it provides for a riveted fastening of sheet materials wherein the ends of the rivet are flush with surfaces of the fastening materials. Further, the present invention is an improvement over U.S. Pat. No. 4,130,922 due to the added shoulder, ridges and neck portions which provide additional holding strength to the rivet for each sheet of material joined thereby.

Headless riveting itself is not new, as indicated by U.S. Pat. Nos. 3,130,489 and 3,729,804. In the prior art, the lower of the pieces being fastened together must be prepunched to provide an opening for the fastening element and in no case is the fastening means flush with the surfaces of the finished work.

Other patents relating to conventional headless rivets include U.S. Pat. Nos. 412,243; 2,375,116; and 2,463,185. The present invention provides a headless rivet that has an improved strength and locking capabilities over conventional rivets.

The present headless rivet comprises flat ends, shank portions adjacent the flat ends, a shoulder interposed between said shank portions, and curved neck portions extending from said shoulder to said shank portions, the curved neck portions preferably having a predetermined radius determined according to the height of the rivet. The shoulder provides a double lock of the material being joined, which material flows on each side of the shoulder locking the material of each sheet of materials on both edges. That is, each separate sheet of material being joined by the present rivet is respectively held in place by the rivet's adjacent undercut (formed by the curved neck portion). Thus the shank portions and shoulder provide individual locking means for each separate sheet of the material.

Another embodiment of the present invention involves a headless rivet having flat ends shank portions adjacent the flat ends, a shoulder interposed between the shank portions, and a ridge interposed between said shoulder and shank portion with neck portions extending from said shoulder to said ridge and the shank portions with the neck portions having a predetermined radius according to the height of the rivet. This embodiment provides additional strength and locking capablity of the rivet to each sheet of material to be riveted.

DESCRIPTION OF THE DRAWINGS

A specific embodiment of this invention is shown in the accompanying drawings, in which.

DETAILED DESCRIPTION OF THE INVENTION

Figure 2:
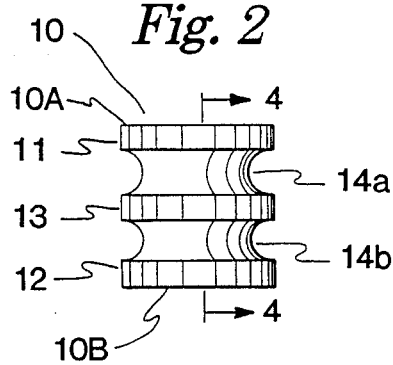
FIG. 2 is a side view of one embodiment of the headless rivet of the present invention.

Referring initially to FIG. 2, the numeral 10 designates generally the headless rivet of the present invention. The rivet 10 has flat ends 10a and 10b of substantially the same size and shape. Along the shank of the rivet 10 adjacent each respective flat end 10a, 10b are formed shank portions 11, 12. Shoulder or platform 13 is interposed between the shank portions 11, 12 for added strength in locking materials that are riveted. Shoulder 13 may be equidistant from shank portions 11 and 12. The shoulder 13, flat ends 10a, 10b and shank portions 11, 12 are preferably generally cylindrical in shape. Curved neck portions 14a and b having a predetermined radius, determined (as more fully described below) in accordance with the height of the rivet, extend from the shoulder 13 to shank portions 11 and 12.

Figure 1:
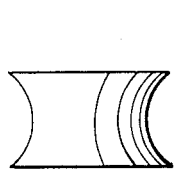
FIG. 1 is a side view of a conventional headless rivet.

The curved neck portions 14a and b form a concavity between shoulder 13 and shank portions 11 and 12. The cross-sectional area of the rivet 10 at the neck portions 14a and b becomes progressively enlarged toward shoulder 13 and shank portions 11 and 12, and reaches a maximum adjacent said shoulder 13 and shank portions 11 and 12. Shoulder 13 provides a stop giving more resistance to the rivet thereby locking it into the material (shown by horizontal lines in FIGS. 4 and 5) being joined. Stated another way, an undercut or curved neck portion (such as 14a 14b) formed between the shank portions 11, 12 and shoulder 13 act to hold each sheet of material being joined, resulting in an overall increase in holding power for the present rivet. This is different from the known prior art rivet designs where the group of sheets being joined are only held at the outer edges of the top and bottom sheets, resulting in a lower overall holding strength. Such conventional headless rivet is shown in FIG. 1 without the added support of any shoulder 13 or multiple undercuts, i.e., curved neck portions 14a, 14b.

Figure 4:
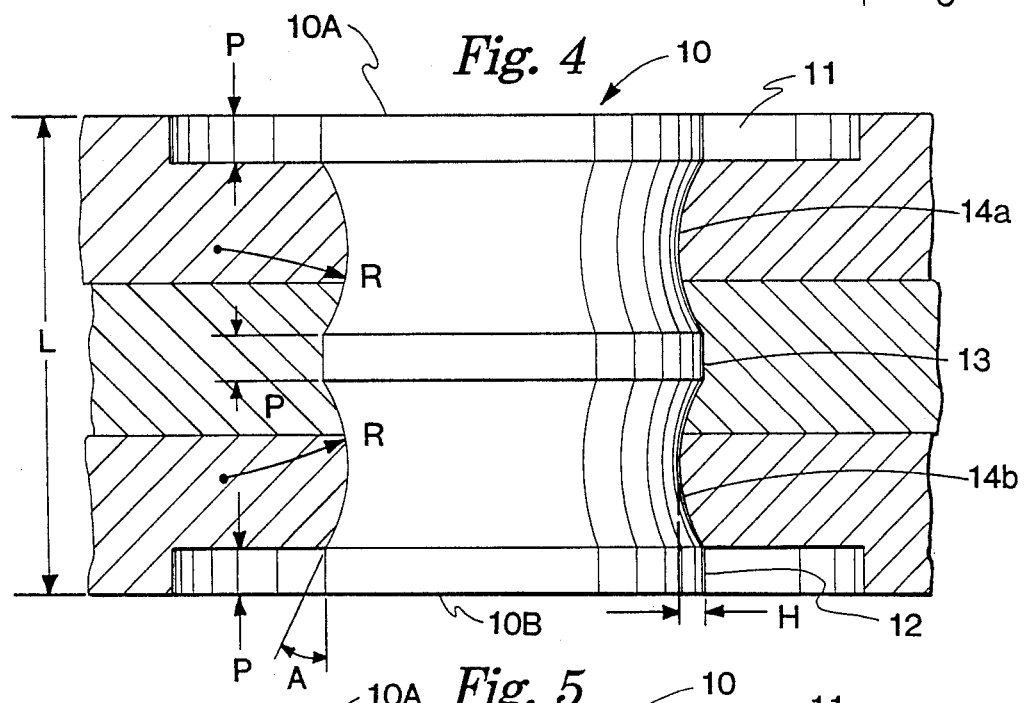
FIG. 4 is a sectional view of line 4, 4 of FIG. 2, showing the rivet locking materials being joined.

Preferably, the predetermined radius, denoted by reference letter R in FIG. 4, is determined, where:

L=Length of rivet 10, as well as the combined thickness of materials being joined.

P=Thickness, i.e. axial height, of platform 13 and shank portions 11, 12; it is generally selected as 0.010 inches, 0.005/−0.000 inches tolerance.

R=Radius of concavity of curved neck portions 14a and 14b.

H=Depth of concavity by the following formulas:

$$H = 10\% \ (L - 3P/2), \text{ with } + .005/ - .000 \text{ inches tolerance.}$$

$$R = \frac{(L - 3P/2)^2 + 4H^2}{8H}$$

It has been found that by forming a rivet having the radius and depth of concavity as determined in accordance with the above formula, the proper volume of material, e.g. metal, is filled in around the rivet, so that a secure riveted joint is achieved. Preferably, the angle A (see FIG. 4) formed between the surface of curved neck areas 14a and 14b relative to their respective shank portions 11 and 12 should be kept as small as possible, so as to provide the rivet 10 with sufficient compressive strength when forced through two or more sheets of metal materials. By forming the presently disclosed headless rivet in accordance with the above formula, the angle A is inherently and advantageously kept to a minimum.

The rivet 10 may be made from any suitable material, such as steel, having a compressive strength greater than that of materials required to be pierced. The height, i.e. axial length, of rivet 10 must be substantially equal to the sum of the thicknesses of the pieces to be fastened together. Rivet 10 may be generally cylindrical in shape.

Figure 3:
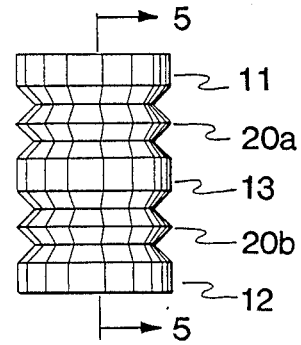
FIG. 3 is a side view of another embodiment of the present invention.
Figure 5:
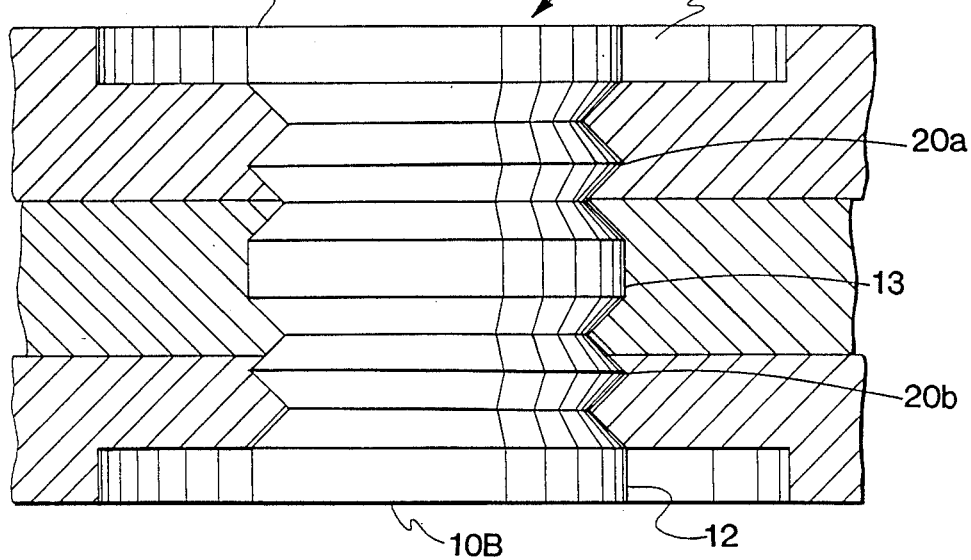
FIG. 5 is a sectional view of line 5, 5 of FIG. 3, showing the alternate form of rivet locking materials being joined.

An alternative embodiment of the present invention is seen in FIG. 3 wherein the modified rivet 10 has ridges 20a and b which are interposed between the shoulder 13 and the shank portions 11 and 12. Each ridge 20 provides yet additional strength to modified rivet 10 for locking each associated sheet of the materials to be joined. Ridges 20a and b are preferrably positioned equiditant from the shoulder 14 and shank portions 11 and 12. While shoulder 13 and ridges 20a and b may be of any shape or design, they are depicted in FIG. 5 as a series of conic shaped elements, but nevertheless in a manner not intended to be limiting. For example, ridges 20a and b are pointed ridges which bases are 45° from an imaginary line drawn from the outer edge of the shoulder 13 to shank portions 11 and 12 of a generally cylindrically shaped rivet 11 again having flat ends 10a, 10b.

It will be apparent to those skilled in the art that while only certain embodiments are set forth herein, alternative embodiments and various modifications are apparent from the above description and are considered equivalents.

I claim:
1. A headless rivet comprising:
  (a) a rivet of a length L which is substantially equal to the sum of the thicknesses of the materials to be fastened together and having flat ends of substantially the same size and shape,
  (b) shank portions respectively formed adjacent said flat ends,
  (c) a shoulder interposed between said shank portions, and
  (d) curved neck portions extending from said shoulder to said shank portions, said curved neck portions having a predetermined radius R and depth of concavity H determined according to the following formula:

$$H = 10\% \; (L - 3P/2), \text{ and}$$
$$R = \frac{(L - 3P/2)^2 + 4H^2}{8H},$$

where:
  L = length of rivet to be used, as determined by the combined thickness of materials being joined, and
  P = thickness of said shoulder and of said shank portions.

2. An improved headless rivet for creating increased holding strength for a plurality of layers of materials joined thereby, comprising in combination:
  a rivet of a length substantially equal to the sum of thicknesses of layers to be joined thereby,
  said rivet including generally flat ends of substantially the same size, shank portions respectively formed adjacent said flat ends, at least one shoulder interposed between said shank portions, curved neck portions extending from said shoulder to said shank portions, whereby there is formed at least one curved neck portion for holding each respective layer of material.

3. The rivet according to claim 1 or 2 wherein said shoulder is positioned equidistant from said flat ends.

4. The rivet according to claim 1 or 2 wherein said shank portions and said shoulder are generally cylindrical in shape.

5. The rivet according to claim 1 or 2 wherein the rivet is of generally cylindrical shape.

6. The rivet according to claim 1 or 2, and including ridges interposed between said shoulder and said shank portions.

7. The rivet according to claim 6 wherein said ridges are positioned equidistant from said shoulder and said shank portions.

8. The rivet according to claim 6 wherein said ridges are positioned at 45° angles from an imaginary line drawn from the edge of said shoulder and said shank portions.

* * * * *